(12) United States Patent
Henry

(10) Patent No.: US 10,396,534 B2
(45) Date of Patent: Aug. 27, 2019

(54) MODULAR CABLE PROTECTOR

(71) Applicant: Stephen K. Henry, Billings, MT (US)

(72) Inventor: Stephen K. Henry, Billings, MT (US)

( * ) Notice: Subject to any disclaimer, the term of this patent is extended or adjusted under 35 U.S.C. 154(b) by 0 days.

(21) Appl. No.: 16/193,813

(22) Filed: Nov. 16, 2018

(65) Prior Publication Data

US 2019/0089140 A1 Mar. 21, 2019

Related U.S. Application Data

(63) Continuation-in-part of application No. 16/037,831, filed on Jul. 17, 2018.

(60) Provisional application No. 62/542,523, filed on Aug. 8, 2017, provisional application No. 62/568,005, filed on Oct. 4, 2017, provisional application No. 62/594,144, filed on Dec. 4, 2017.

(51) Int. Cl.
*H02G 3/04* (2006.01)
*H02G 9/02* (2006.01)

(52) U.S. Cl.
CPC ........... *H02G 3/0475* (2013.01); *H02G 9/025* (2013.01); *H02G 3/0487* (2013.01)

(58) Field of Classification Search
CPC ............ H02G 9/04; H02G 3/34; H02G 9/025; H02G 3/0418; H02G 3/0437; H02G 3/04; H02G 3/00; H02G 3/0406; H02G 3/263; H02G 9/00; H02G 9/02; H02G 3/22; H02G 3/30; H02G 3/36; B66F 15/00; E01C 5/226; E01C 13/04; E01C 9/086
USPC ...... 174/68.1, 101, 97, 70 C, 70 R, 68.3, 95, 174/72 R, 75 R; 248/74.1, 74.2, 68.1, 49; 14/69.5; 52/220.1, 220.8, 220.7
See application file for complete search history.

(56) References Cited

U.S. PATENT DOCUMENTS

| | | | |
|---|---|---|---|
| 3,888,186 A | 6/1975 | Jentzsch et al. | |
| 5,095,822 A | 3/1992 | Martin | |
| D412,490 S | 8/1999 | Henry | |
| D415,112 S | 10/1999 | Henry | |
| 6,499,410 B1 * | 12/2002 | Berardi .................. | A62C 33/06 104/275 |
| 6,747,212 B1 * | 6/2004 | Henry .................... | H02G 3/283 174/101 |
| 7,145,079 B1 * | 12/2006 | Henry ................... | H02G 3/0418 174/101 |
| 7,309,836 B2 * | 12/2007 | Lubanski ............. | H02G 3/0418 174/720 |

(Continued)

OTHER PUBLICATIONS

Photograph of a "Guard Dog" cable protector—male connector, Checkers Industrial Safety Products, Inc., Broomfield, CO (Oct. 1, 2018).

(Continued)

*Primary Examiner* — Angel R Estrada
(74) *Attorney, Agent, or Firm* — Dorr, Carson & Birney PC

(57) ABSTRACT

A modular cable protector can be removably connected in series with like cable protectors by complementary male and female end connectors. A number of openings extend downward along the peripheral walls of the adjacent end connectors to define a pattern of gaps and regions of contact between adjacent end connectors. Preferably, undercuts extend from the lower portions of the openings. A tool can be used to removably engage these openings and undercuts, thereby allowing a user to exert an upward force to disengage the end connectors on adjacent cable protectors.

8 Claims, 25 Drawing Sheets

(56) References Cited

U.S. PATENT DOCUMENTS

| | | | |
|---|---|---|---|
| D563,323 S | | 3/2008 | Henry |
| 8,001,643 B1 | | 8/2011 | James |
| 8,309,850 B2 | * | 11/2012 | Henry .................. H01R 25/164 |
| | | | 174/68.1 |
| 8,434,739 B1 | | 5/2013 | Connolly |
| D717,248 S | * | 11/2014 | Coffman ...................... D13/155 |
| 9,059,574 B2 | | 6/2015 | Coffman et al. |
| 9,438,022 B2 | | 9/2016 | Lioi |
| 2016/0023873 A1 | | 1/2016 | Kasan |

OTHER PUBLICATIONS

Photograph of a "Guard Dog" cable protector—female connector, Checkers Industrial Safety Products, Inc., Broomfield, CO (Oct. 1, 2018).

Photograph of an "Elasco" cable protector—male connector, Elasco Products, Huntington Beach, CA (Oct. 1, 2018).

Photograph of an "Elasco" cable protector—female connector, Elasco Products, Huntington Beach, CA (Oct. 1, 2018).

Photograph of a "Titan" cable protector—male connector, FallLine Corporation, Reno, NV (Oct. 1, 2018).

Photograph of a "Titan" cable protector—female connector, FallLine Corporation, Reno, NV (Oct. 1, 2018).

Photograph of a "Guardian" cable protector—male connector, Discount Ramps.com, LLC, West Bend, WI (Oct. 1, 2018).

Photograph of a "Guardian" cable protector—female connector, Discount Ramps.com, LLC, West Bend, WI (Oct. 1, 2018).

Photograph of a "PowerRamp" cable protector—male connector, Lex Products, Shelton, CT (Oct. 1, 2018).

Photograph of a "PowerRamp" cable protector—female connector, Lex Products, Shelton, CT (Oct. 1, 2018).

BestSea—Products Details (Oct. 29, 2018).

\* cited by examiner

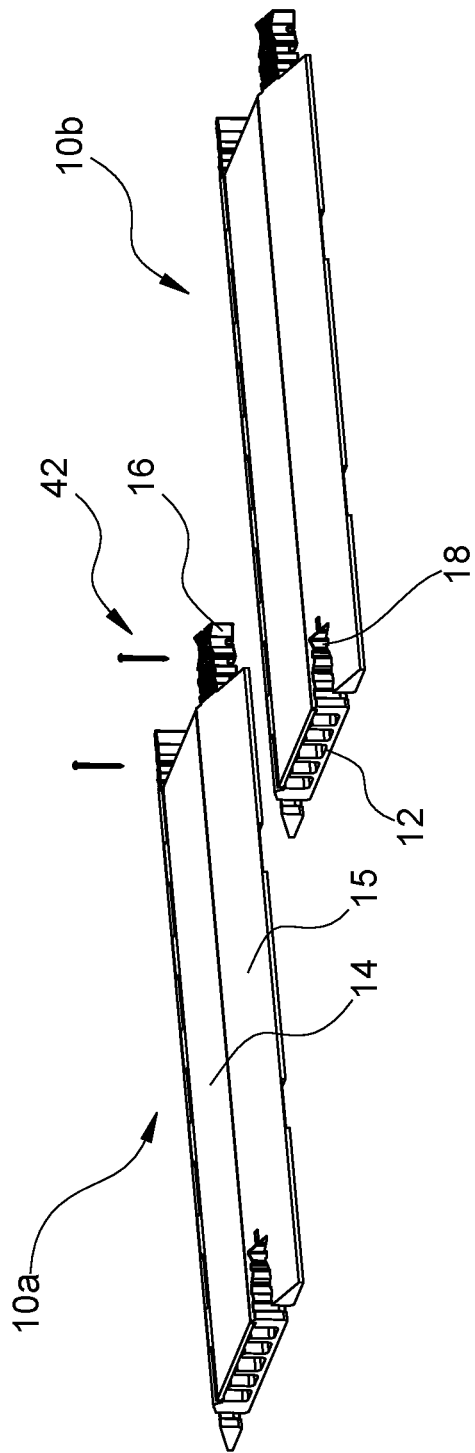

MODULAR CABLE PROTECTOR

RELATED APPLICATIONS

The present application is a continuation-in-part of the Applicant's co-pending U.S. patent application Ser. No. 16/037,831, entitled "Modular Cable Protector," filed on Jul. 17, 2018, which is based on and claims priority to U.S. Provisional Patent Application 62/542,523, filed on Aug. 8, 2017; and U.S. Provisional Patent Application 62/568,005, filed on Oct. 4, 2017; and U.S. Provisional Patent Application 62/594,144, filed on Dec. 4, 2017.

BACKGROUND OF THE INVENTION

Field of the Invention

The present invention relates generally to the field of modular cable protectors. More specifically, the present invention discloses a modular cable protector with end connectors having a pluralilty of openings at intervals along the edges of the end connectors to facilitate disengaging a series of such cable protectors.

Statement of the Problem

Modular cable protectors have been used for many years to protect cables, hoses and wiring from vehicular traffic and to minimize trip hazards for pedestrians. Cable protectors are frequently used at public events, such as concerts and sports events. Cable protectors are also used in factories, warehouses, mines and other situations where temporary cables, hoses and the like are deployed.

U.S. Design Pat. No. 412,490 (Henry) shows an example of a modular cable protector that has been widely used in the industry. As shown in the accompanying figures, a modular cable protector 10 typically includes a number of parallel, recessed channels 12 extending between the ends of the cable protector for carrying cables, hoses, wiring or the like. Two opposing side ramps 15 guide traffic over the cable protector. Complementary sets of end connectors 16 and 18 at the ends of the cable protector enable multiple cable protectors to be connected in series. For example, the cable protector shown in the Henry design patent features complementary male and female end connectors that are generally T-shaped. Several other end connector shapes are also commonly used. A lid 14 covers the channels and forms the top surface of the cable protector when the lid is closed. The lid pivots about a hinge running along one side so that the lid can be raised to provide access to the channels 12.

These cable protectors can be strung together in series to any desired length by engaging the complementary male and female connectors at the ends of the cables protectors. Large numbers of these cable protectors are often used at large sports or music venues. The problem is that disassembling these cable protectors can be very labor intensive. A worker must stoop down at the end of each cable protector and place his fingers under its side ramps to exert an upward force to disengage its end connectors from the adjacent cable protector.

Conventional end connectors are typically designed to tightly engage complementary end connectors on an adjacent cable protector. This helps ensure a tight connection between cable protectors, which maintains proper alignment of the channels and reduces the risk of creating a trip hazard caused by openings between cable protectors. However, this tight fit can also make it difficult to disengage the end connectors, particularly if the end connectors bind against one another due to torsion or non-vertical force components. Cable protectors are usually large and heavy, so it can be difficult to lift a cable protector straight upward to disengage it from the adjacent cable protector. This results in non-vertical movement and forces that tend to bind the end connectors and make it difficult to disengage them. Thus, a need exists for end connectors that maintain a tight fit and alignment between cable protectors, and can also be readily disengaged with a reasonable degree of effort.

Solution to the Problem

The present invention addresses this problem by providing a cable protector with complementary male and female end connectors having a plurality of openings spaced at intervals along the edges of the end connectors. This creates a pattern of gaps and regions of contact between the walls of adjacent end connectors to provide an enhanced degree of flexibility and help prevent binding. It also reduces the friction fit of the male and female end connectors, which makes it easier to connect and disconnect the end connectors while maintaining a stable and firm connection.

Preferably, at least some of the openings are equipped with an undercut extending laterally from the lower portion to the opening. The openings and undercuts can be removably engaged by a hand tool to quickly and easily disengage the end connectors on adjacent cable protectors. The worker can insert this tool into the opening to engage the undercut and then exert an upward force to disengage the end connectors from the adjacent cable protector. For example, the tool can have two vertical members that fit into the slots with horizontal protrusions at the bottom of the vertical members to engage the undercuts in the opening.

SUMMARY OF THE INVENTION

This invention provides a modular cable protector having a number of parallel channels for carrying cables and the like, with complementary end connectors at each end for removably engaging adjacent cable protectors in series. A number of openings extend downward at intervals along the edges of the adjacent end connectors to create a pattern of gaps and regions of contact between the peripheral walls of adjacent end connectors. For example, these openings can run along the peripheral edges of either or both of the male and female end connectors. Preferably, the openings include undercuts protruding horizontally from the lower portion of the openings. A tool can be used to removably engage these openings and undercuts, thereby allowing a user to exert an upward force to disengage the end connectors on adjacent cable protectors. For example, a tool with vertical members can be manually inserted into the openings to disengage the cable protectors. Horizontal projections at the bottom of the vertical members engage the undercuts and allow the user to disengage adjacent cable protectors by lifting upward on the tool.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which:

FIG. 25 is an exploded axonometric view of a screw 42 being inserted through an openings 20 in the end connectors 16, 18 to anchor two assembled cable protectors 10a, 10b to the ground.

DETAILED DESCRIPTION OF THE INVENTION

Figure 1:
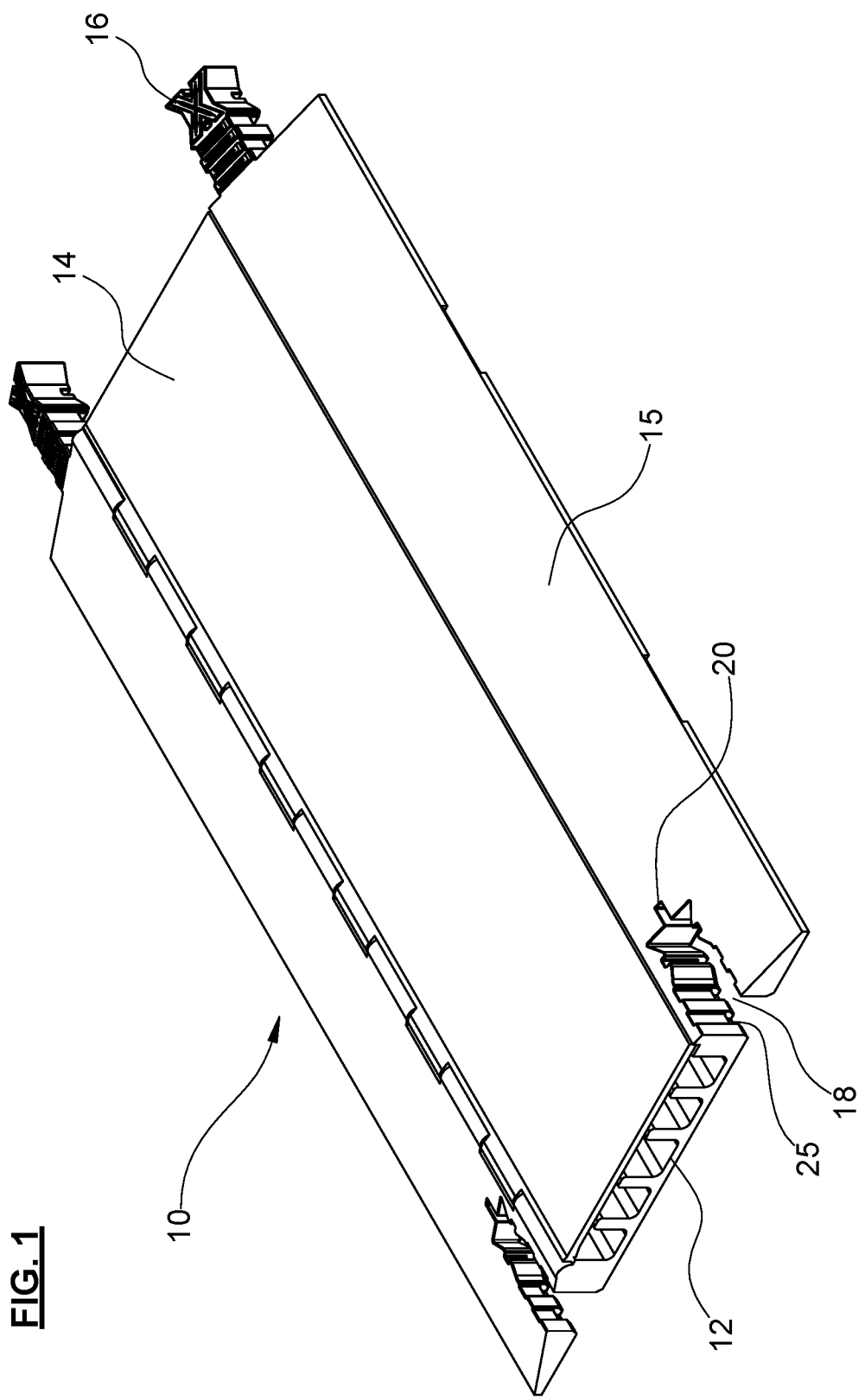
FIG. 1 is a top axonometric view of a modular cable protector 10 with sets of male and female end connectors 16, 18.
Figure 2:
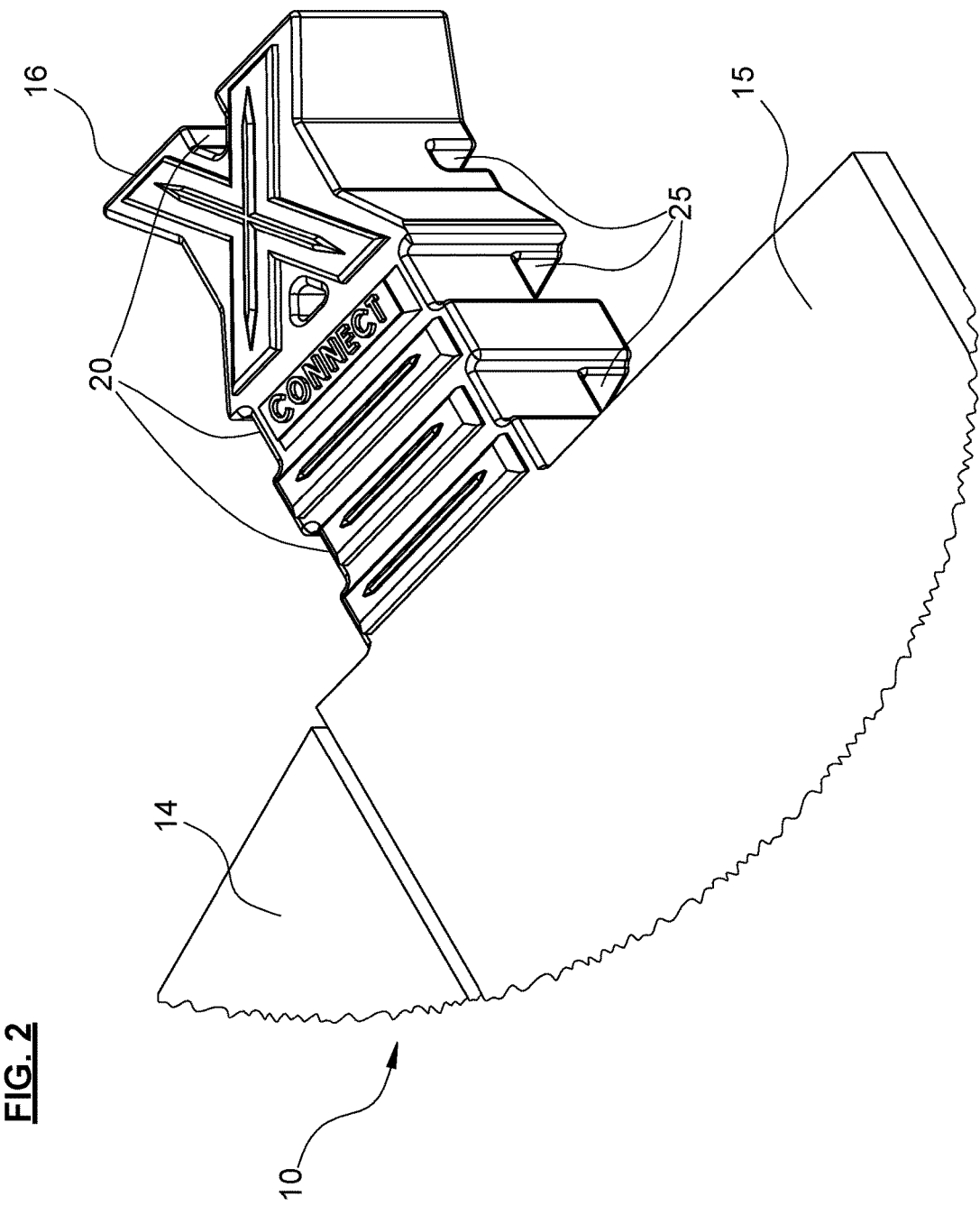
FIG. 2 is a top axonometric view of a male end connector 16.
Figure 3:
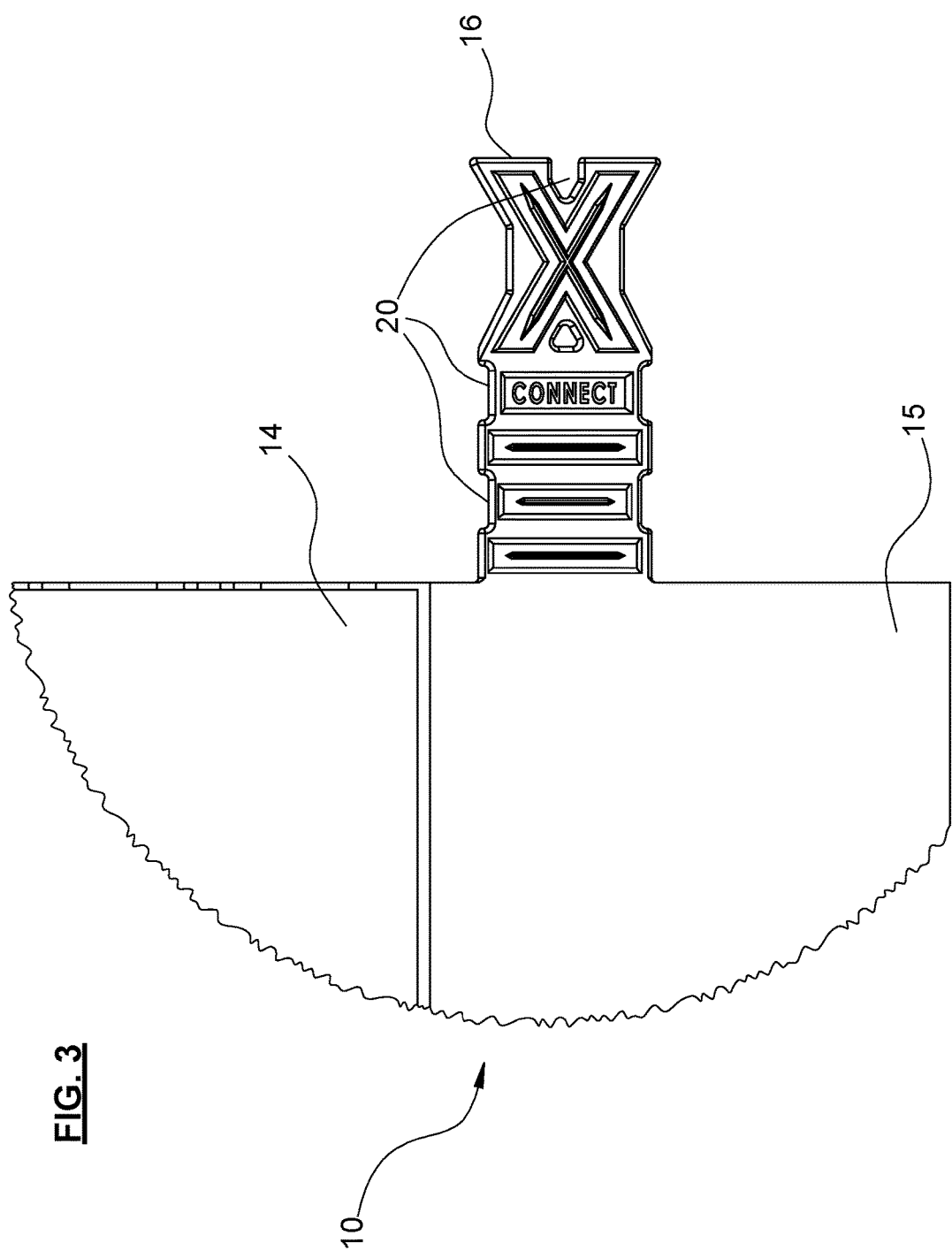
FIG. 3 is a top plan view of a male end connector 16.
Figure 4:
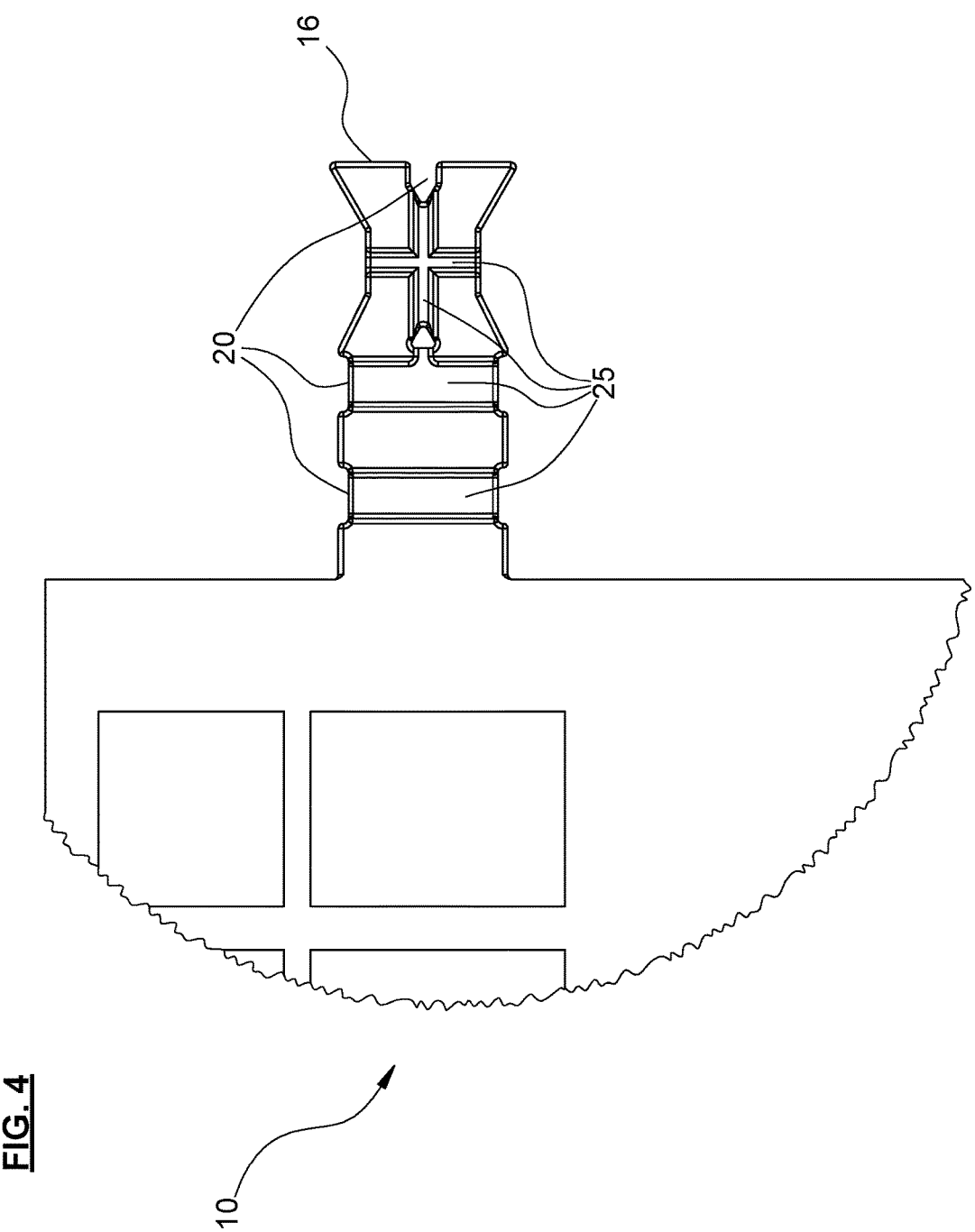
FIG. 4 is a bottom plan view of a male end connector 16.
Figure 5:
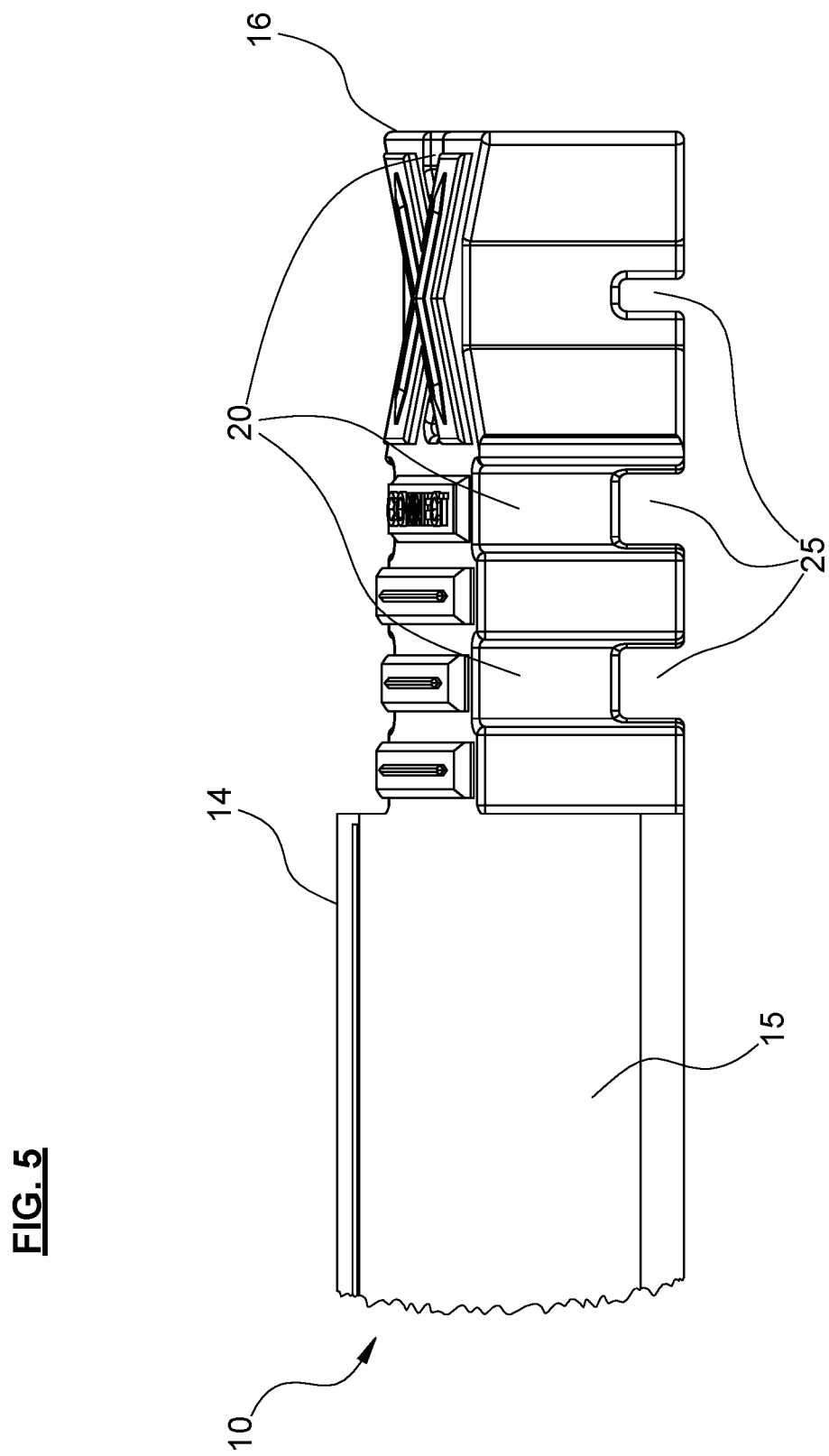
FIG. 5 is a left side elevational view of a male end connector 16.
Figure 6:
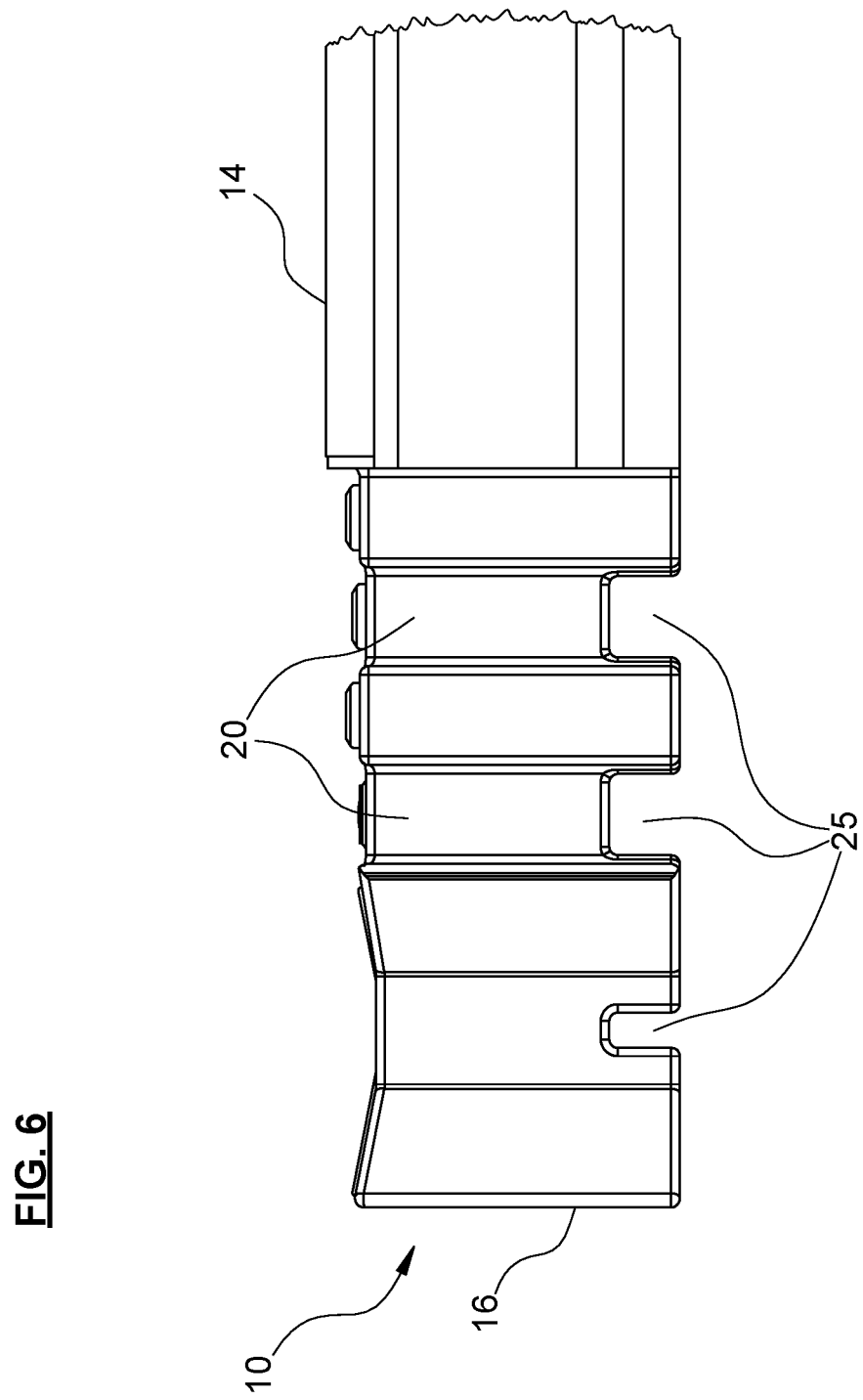
FIG. 6 is a right side elevational view of a male end connector 16.
Figure 7:
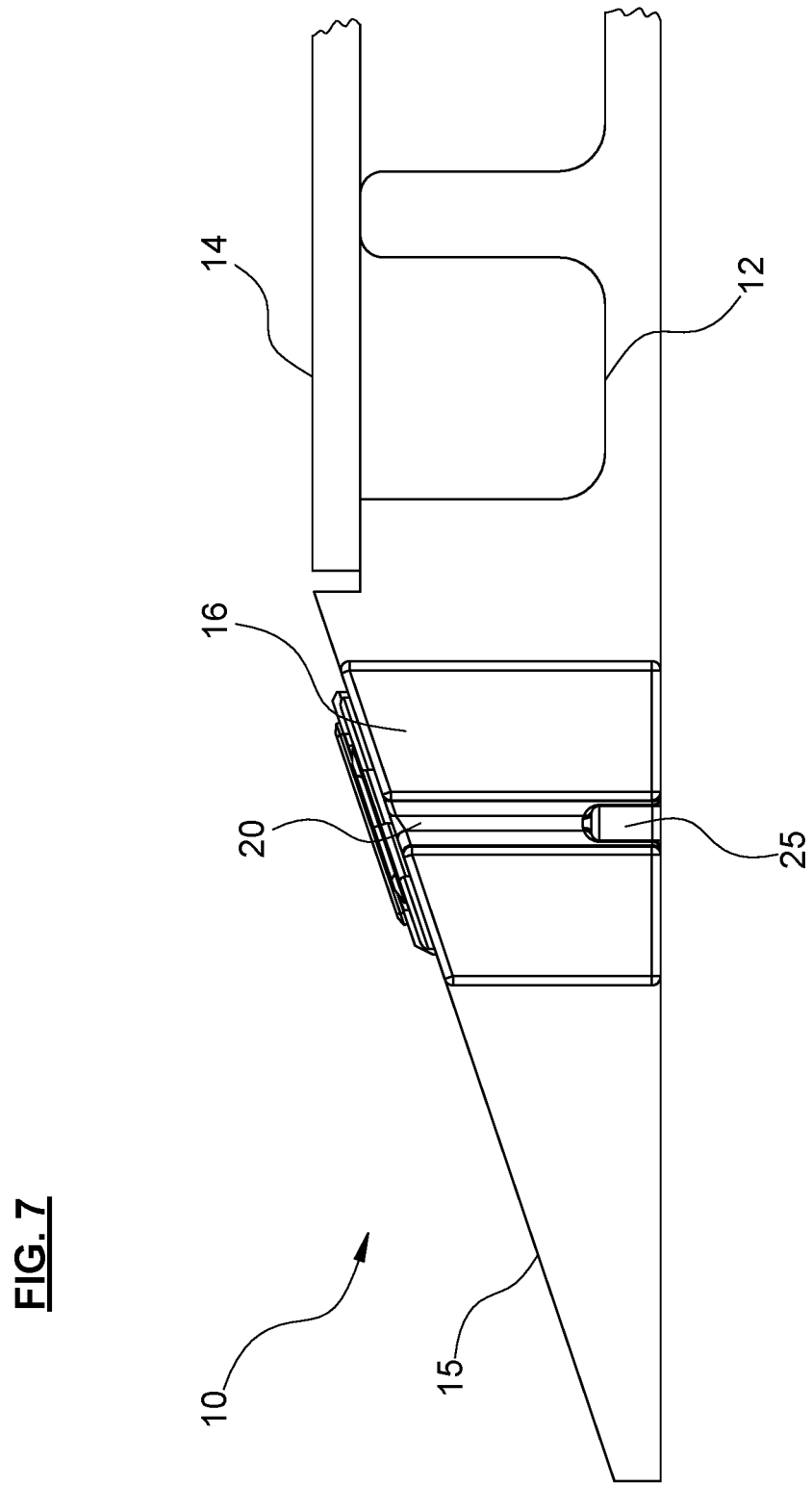
FIG. 7 is a front elevational view of a male end connector 16.
Figure 8:
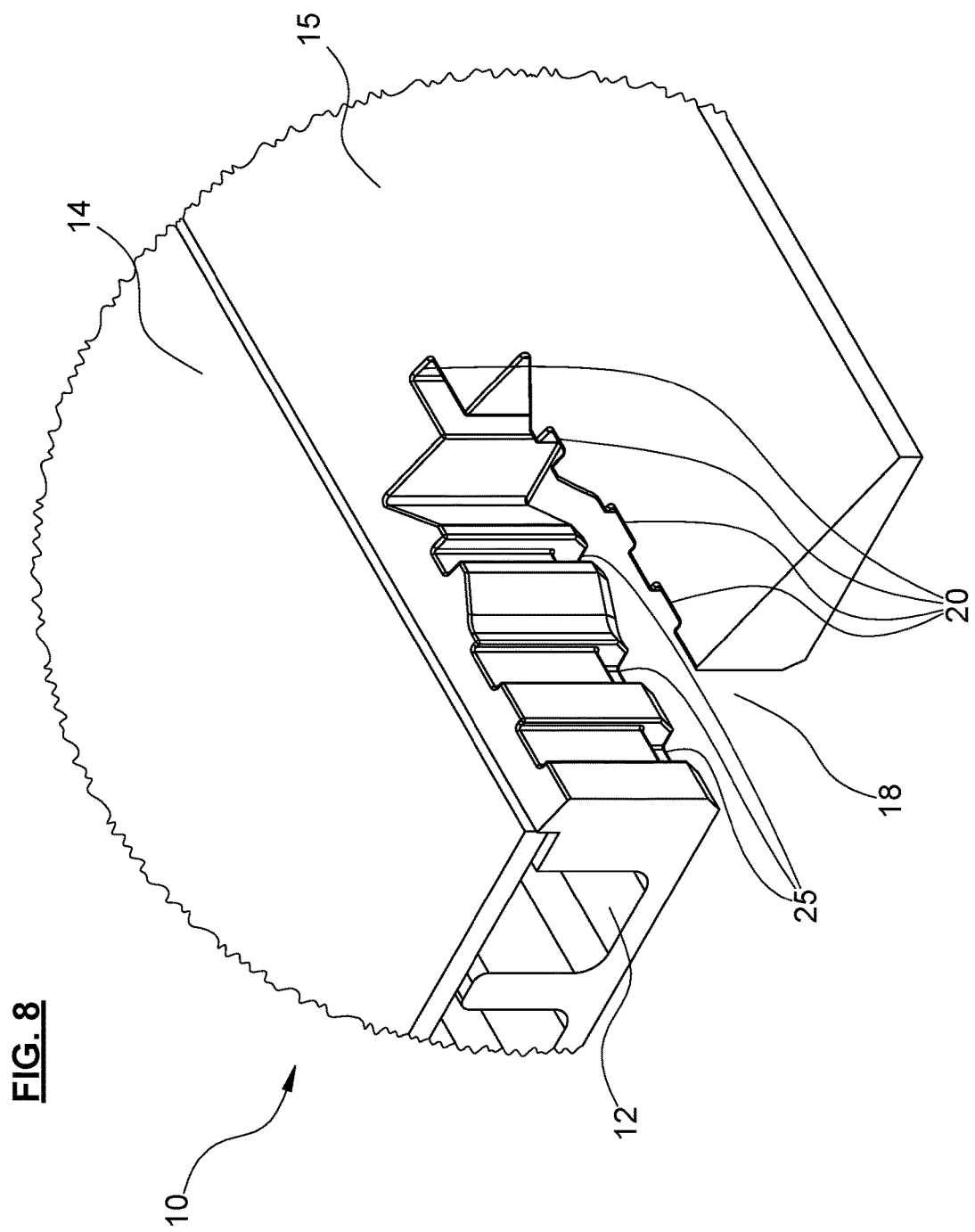
FIG. 8 is a top axonometric view of a female end connector 18.
Figure 9:
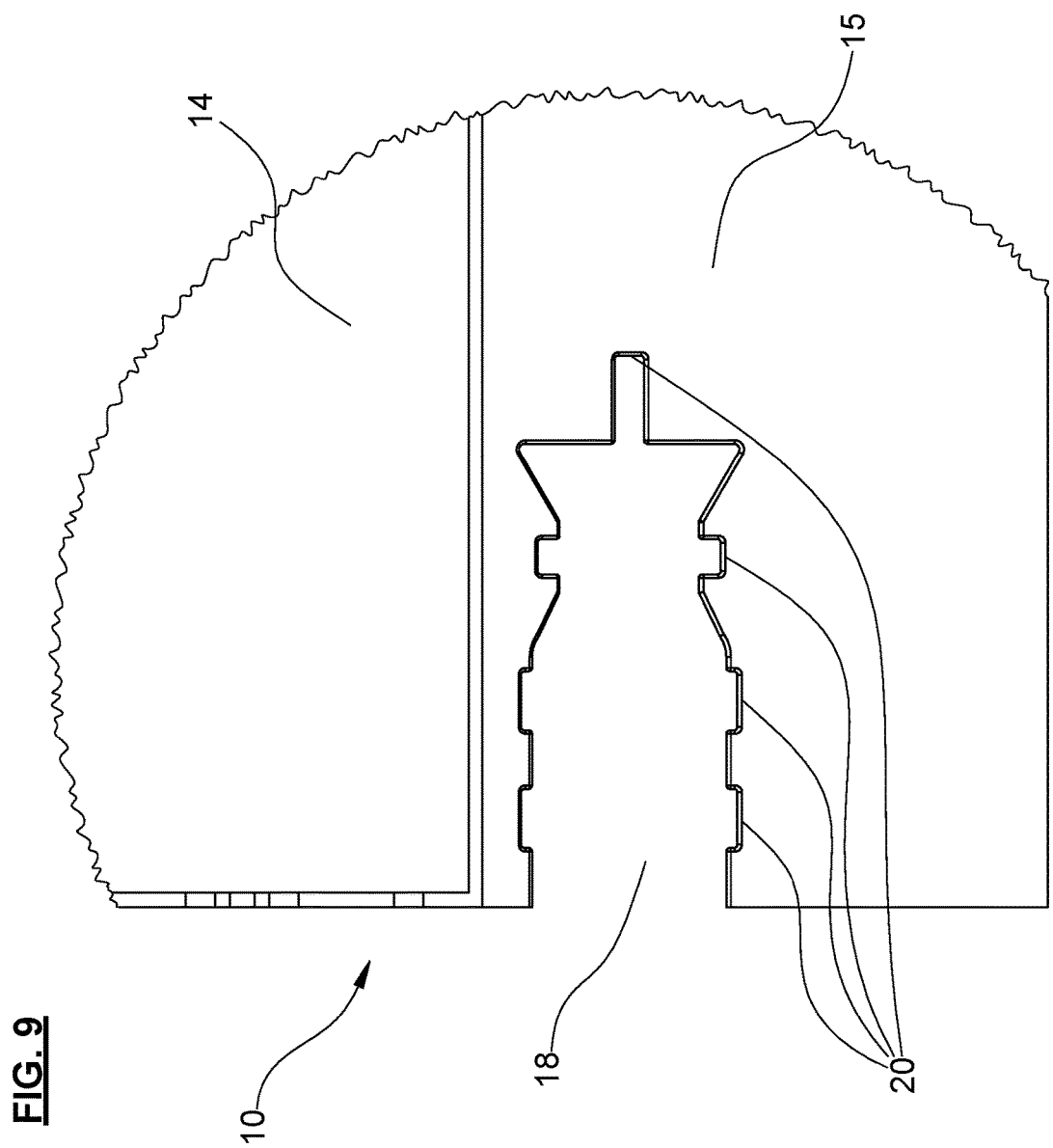
FIG. 9 is a top plan view of a female end connector 18.
Figure 10:
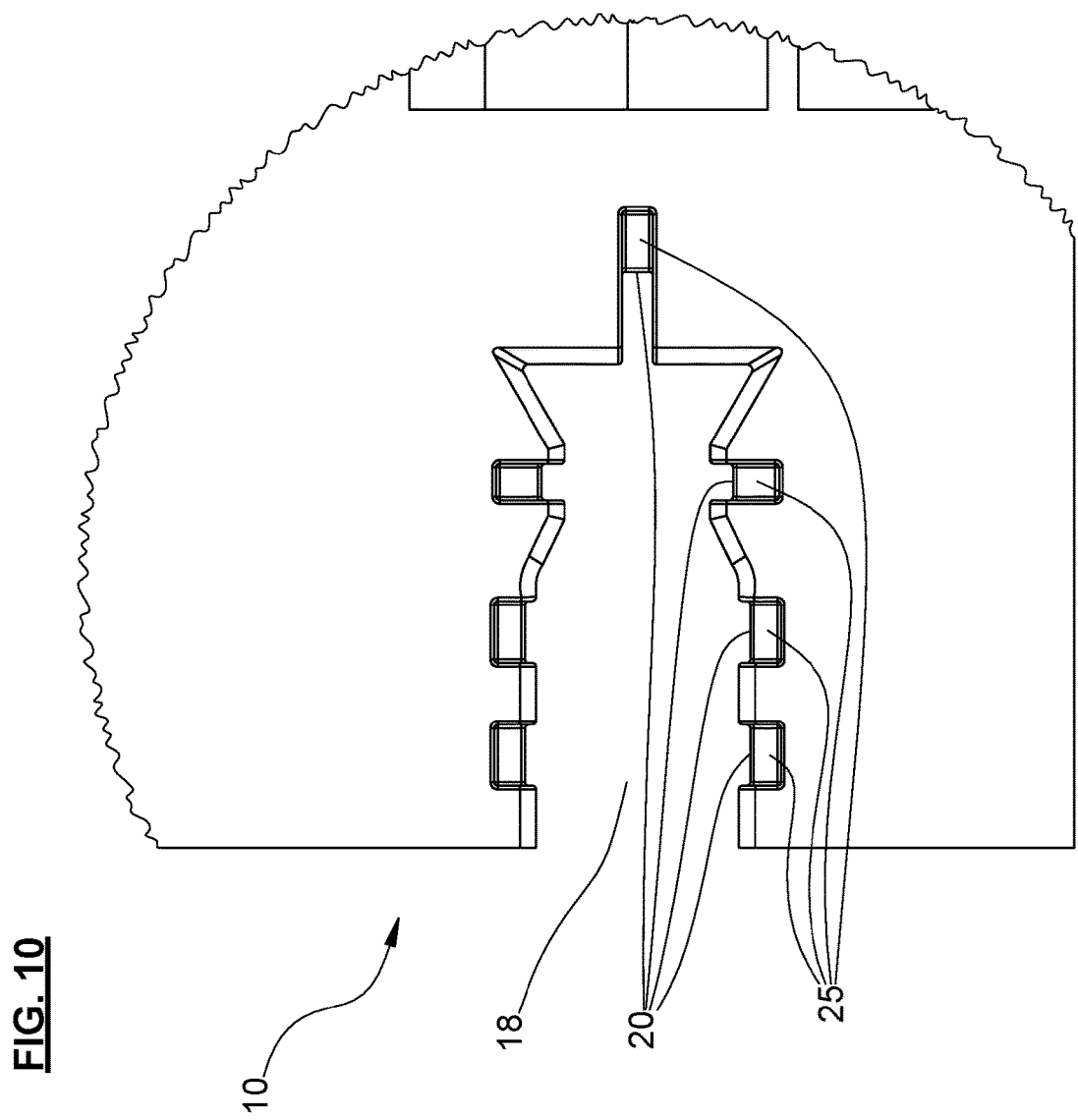
FIG. 10 is a bottom plan view of a female end connector 18.
Figure 11:
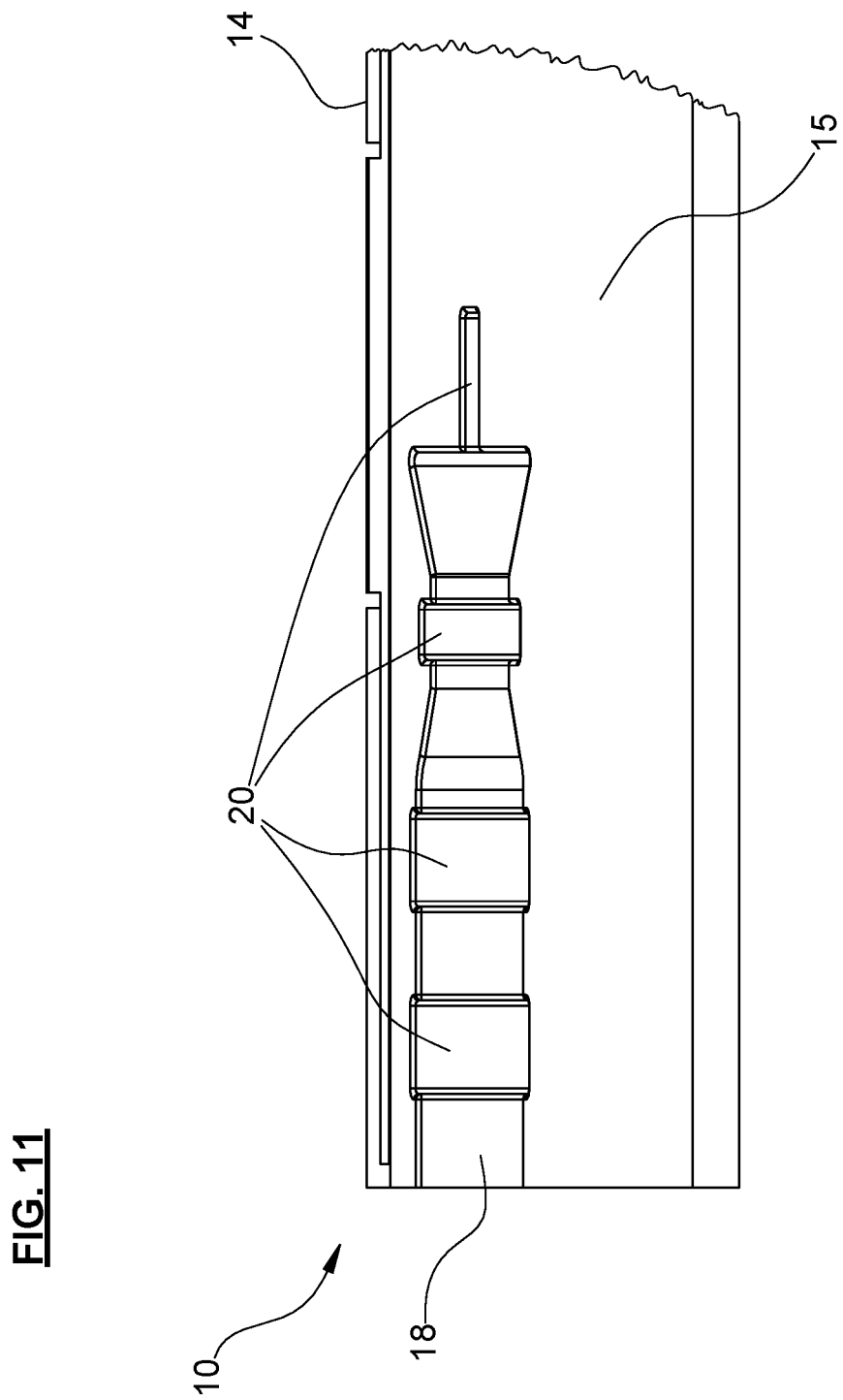
FIG. 11 is a left side elevational view of a female end connector 18.
Figure 12:
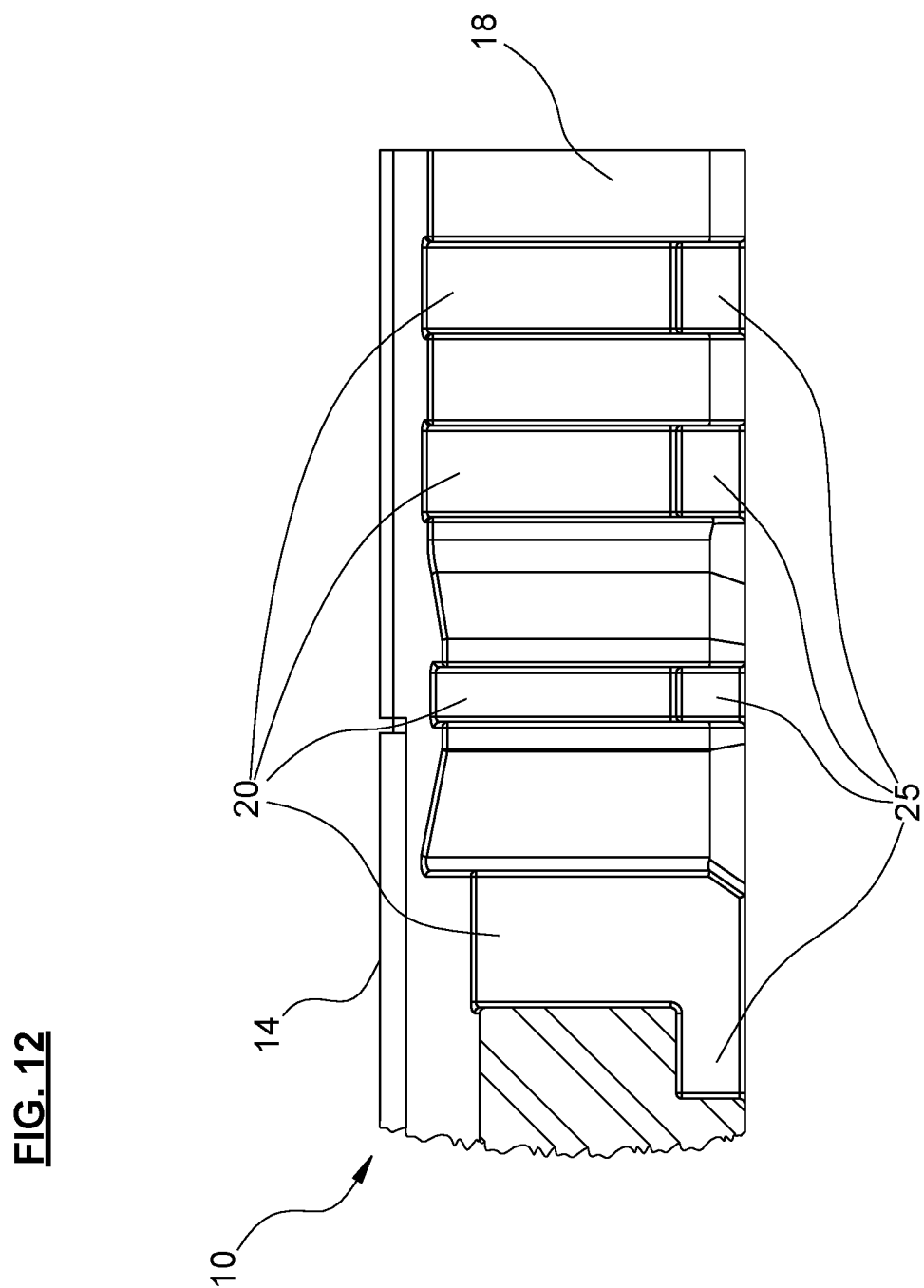
FIG. 12 is a right side elevational view of a female end connector 18.
Figure 13:
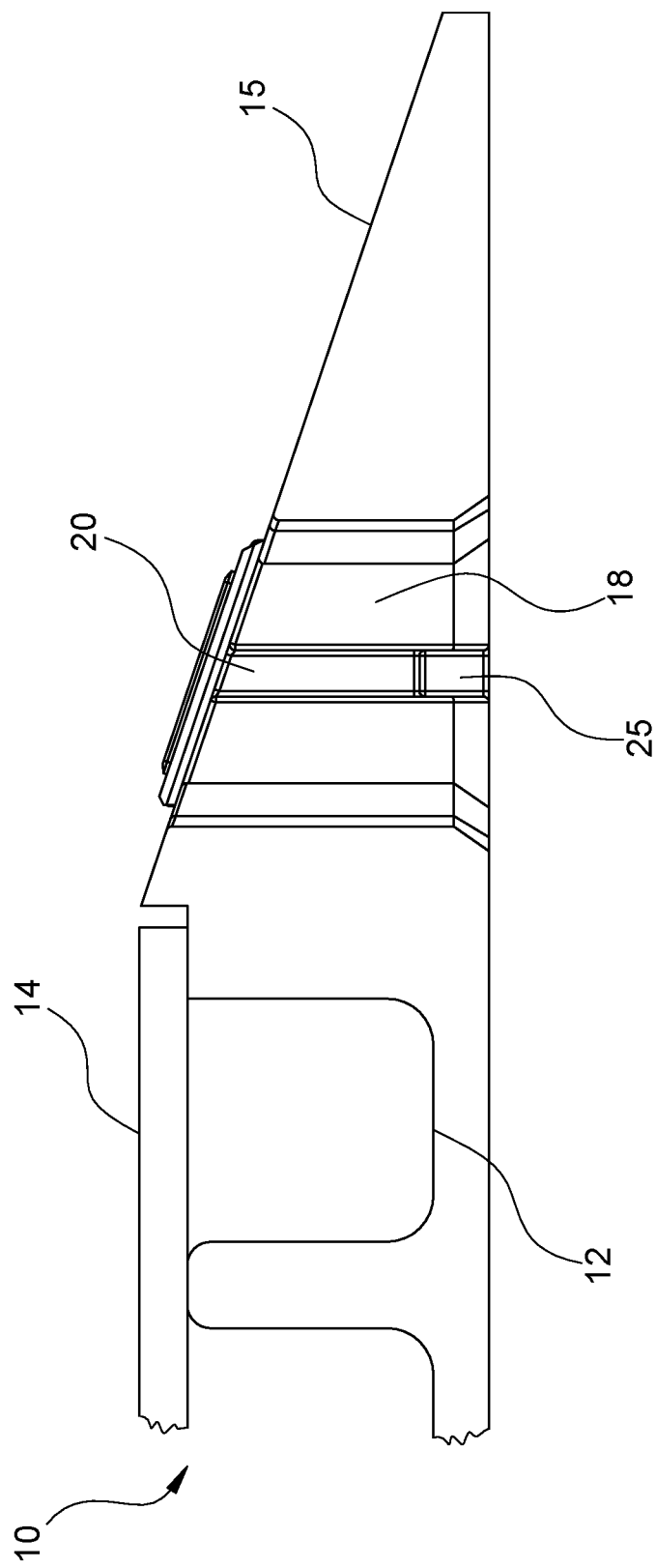
FIG. 13 is a front elevational view of a female end connector 18.
Figure 16:
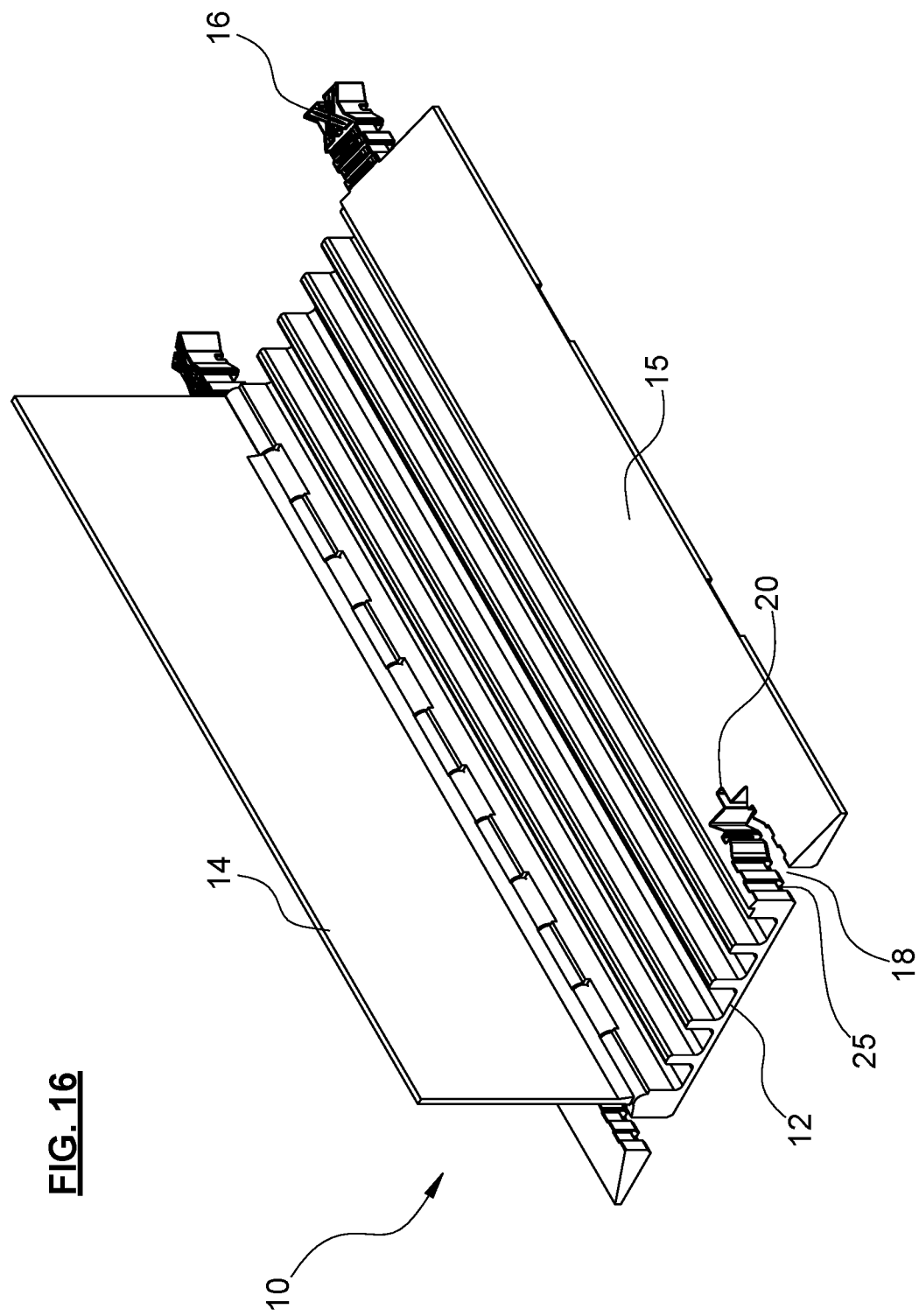
FIG. 16 is a top axonometric view of a modular cable protector 10 corresponding to FIG. 1 with the lid 14 open.

FIG. 1 is a top axonometric view showing an embodiment of the present modular cable protector 10. The body of the cable protector 10 includes a number of parallel, recessed channels 12 extending between its ends for carrying cables, hoses, wiring or the like. Two opposing side ramps 15 guide traffic over the cable protector. A lid 14 covers the channels 12. The lid 14 and side ramps 15 form the upper surface of the cable protector 10 when the lid 14 is closed to cover the interior channels 12 as illustrated in FIG. 1. FIG. 16 shows the cable protector 10 with the lid 14 open to allow access to the channels 12.

Figure 14:
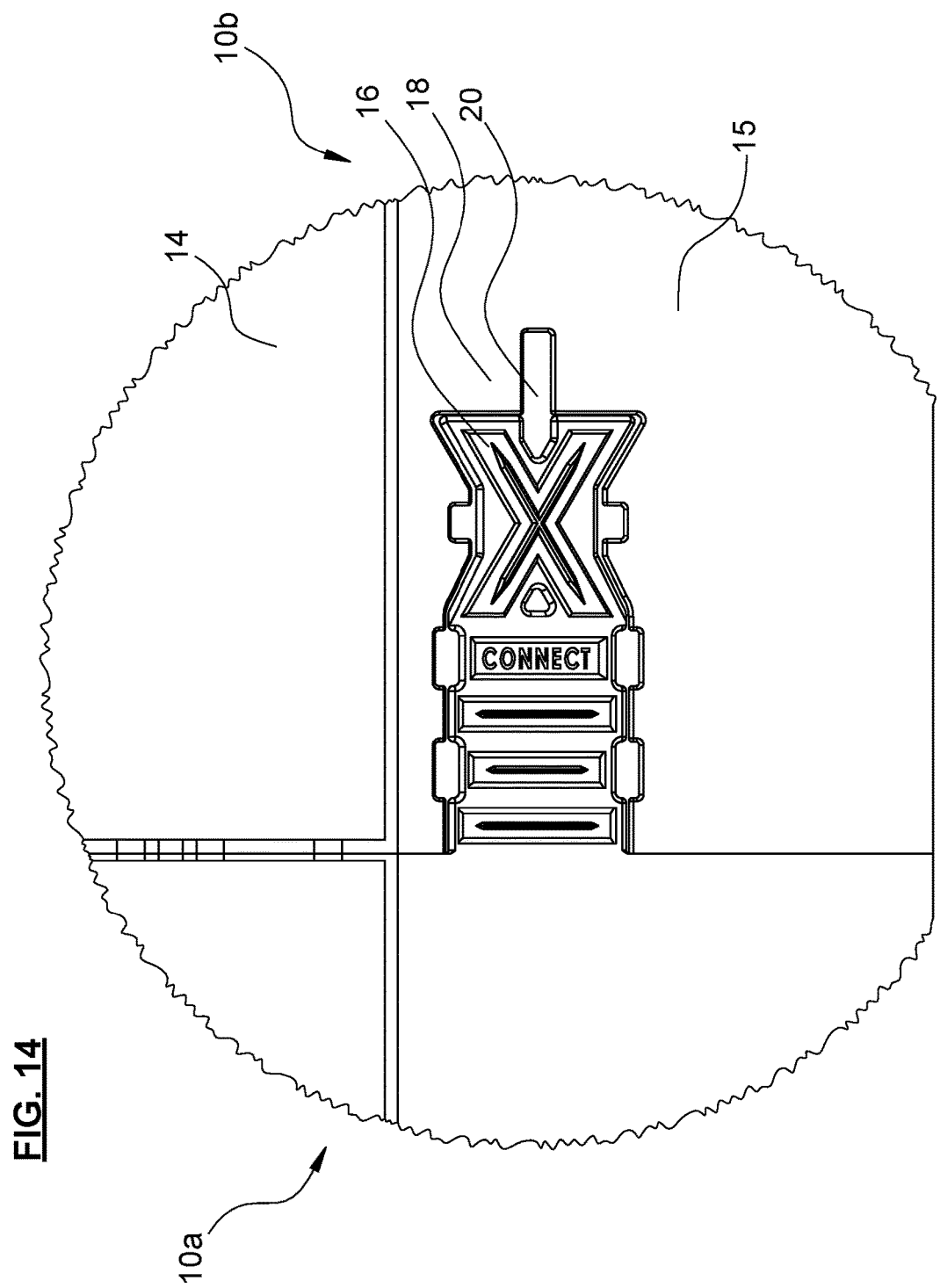
FIG. 14 is a top plan view of the assembled male and female end connectors 16, 18 joining two modular cable protectors 10a, 10b.
Figure 15:
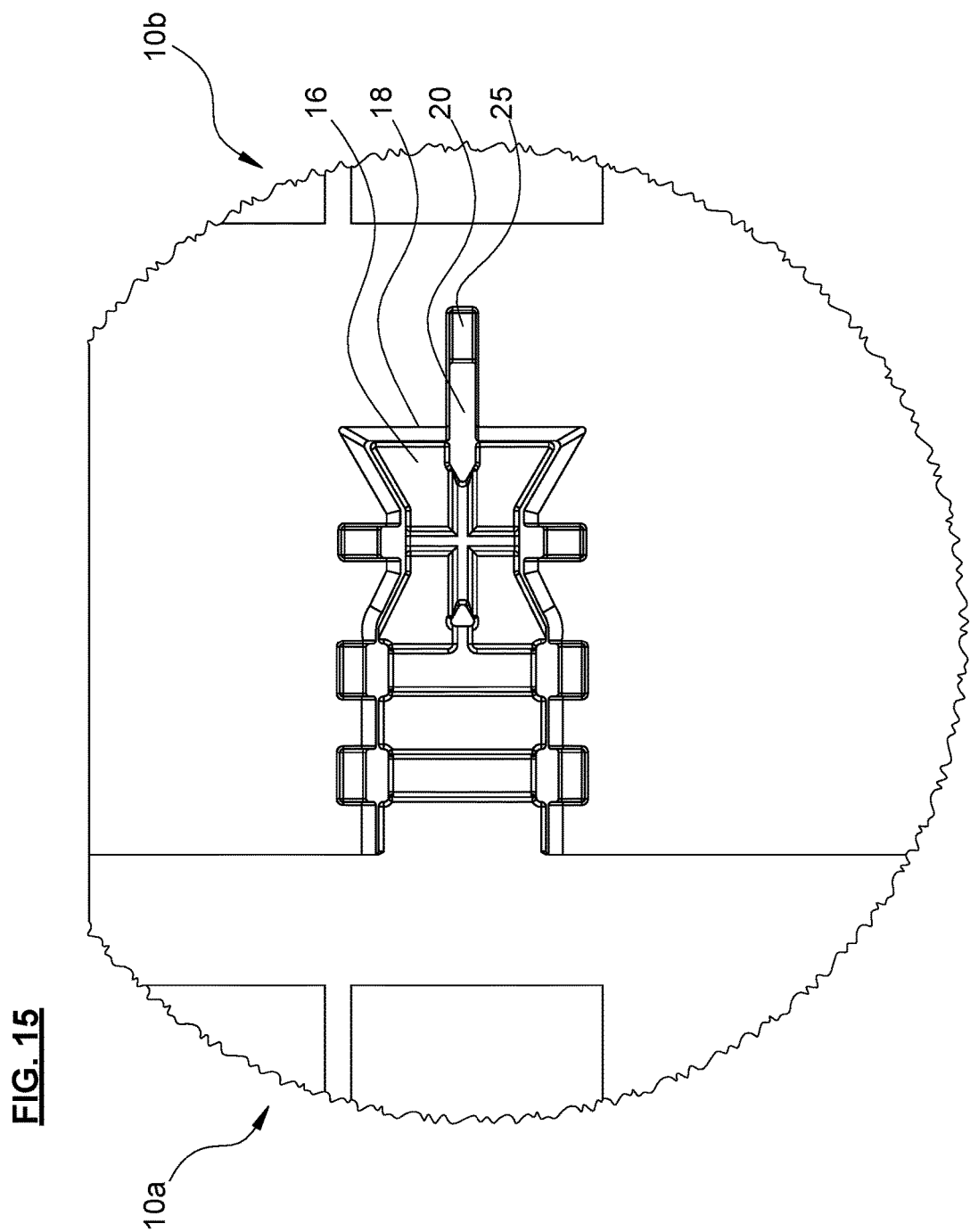
FIG. 15 is a bottom plan view of the assembled male and female end connectors 16, 18 corresponding to FIG. 14.
Figure 17:
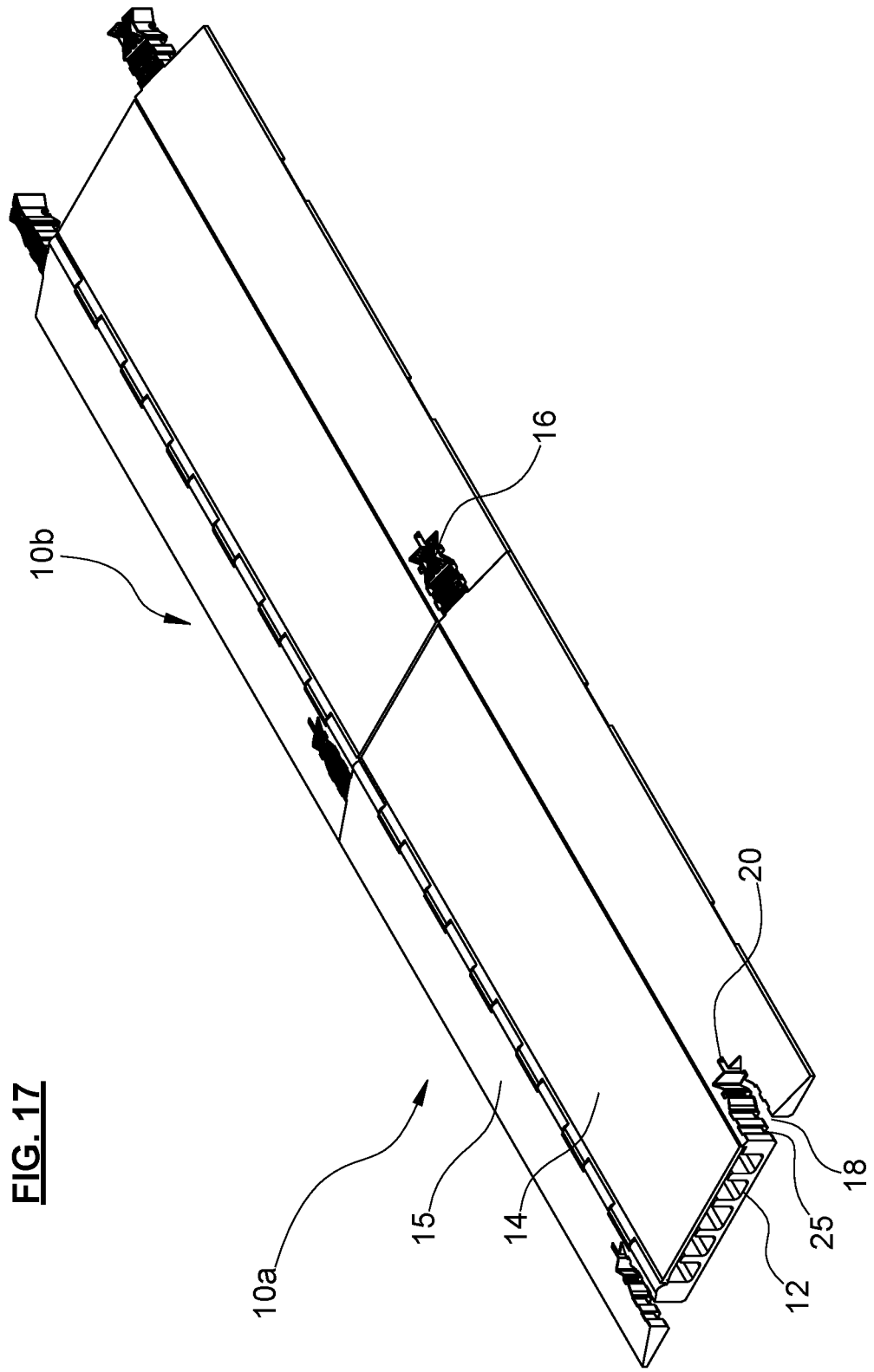
FIG. 17 is a top axonometric view of two assembled cable protectors 10a and 10b.

Complementary sets of male and female end connectors 16, 18 at the ends of the cable protector 10 enable multiple cable protectors 10a, 10b to be connected in series with the channels 12 of the cable protectors in alignment as shown in FIGS. 14, 15 and 17. This can be continued for any desired number of the cable protectors. FIGS. 2-7 illustrate an embodiment of the male end connectors 16. Each male end connector 16 has an upper surface that generally continues the upper surface of cable protector, and vertical peripheral walls that extend downward from the peripheral edges of the upper surface of the male end connector. As shown in FIGS. 8-13, the female end connectors 18 extend into the ends of the body of the cable protector 10 and have vertical peripheral walls that are largely complementary to those of the male end connectors 16. This enables the female end connectors 18 to receive and removably engage the male end connectors 16, as shown in FIGS. 14, 15 and 17.

Figure 18:
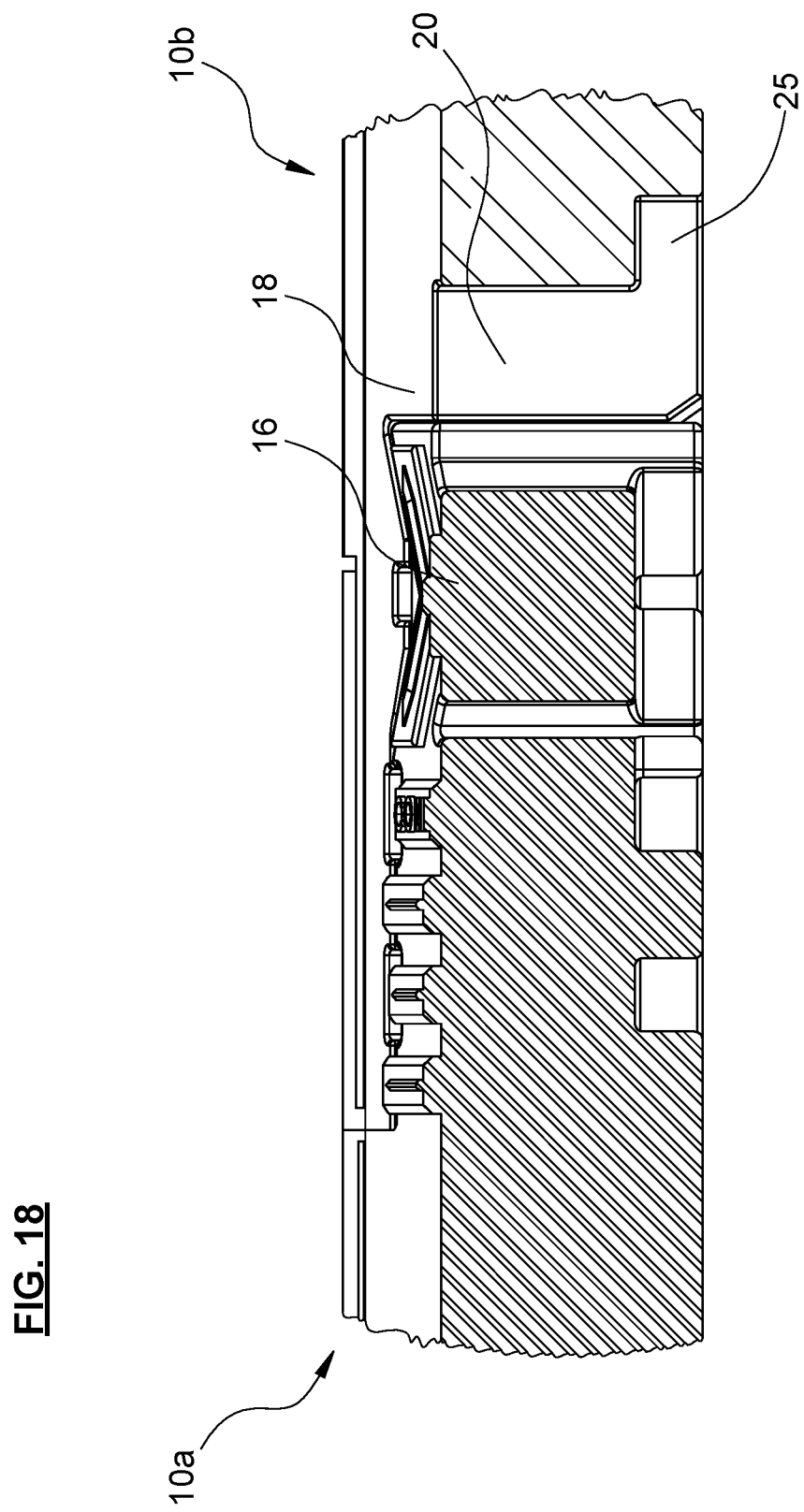
FIG. 18 is a detail vertical cross-sectional view of the end connectors 16, 18 of the assembled cable protectors 10a, 10b in FIG. 17.

At least one of the end connectors 16, 18 on each end of each cable protector 10 includes a plurality of openings 20 extending vertically downward from the upper peripheral edges at intervals along the peripheral walls of the end connector 16, 18. For example, vertical openings 20 can be formed in both side walls of each adjacent pair of male and female end connectors 16, 18. These openings 20 can be formed as vertical slots or channels for removably engaging a tool, as will be discussed in greater detail below. These openings 20 define a pattern of gaps and regions of contact between the side walls of adjacent end connectors. Preferably, at some of the openings 20 have at least one undercut or lip 25 extending horizontally from their lower ends. FIG. 18 is a cross-sectional view of the assembled end connectors 16, 18 of two adjacent cable protectors 10a, 10b corresponding to FIG. 17.

Figure 19:
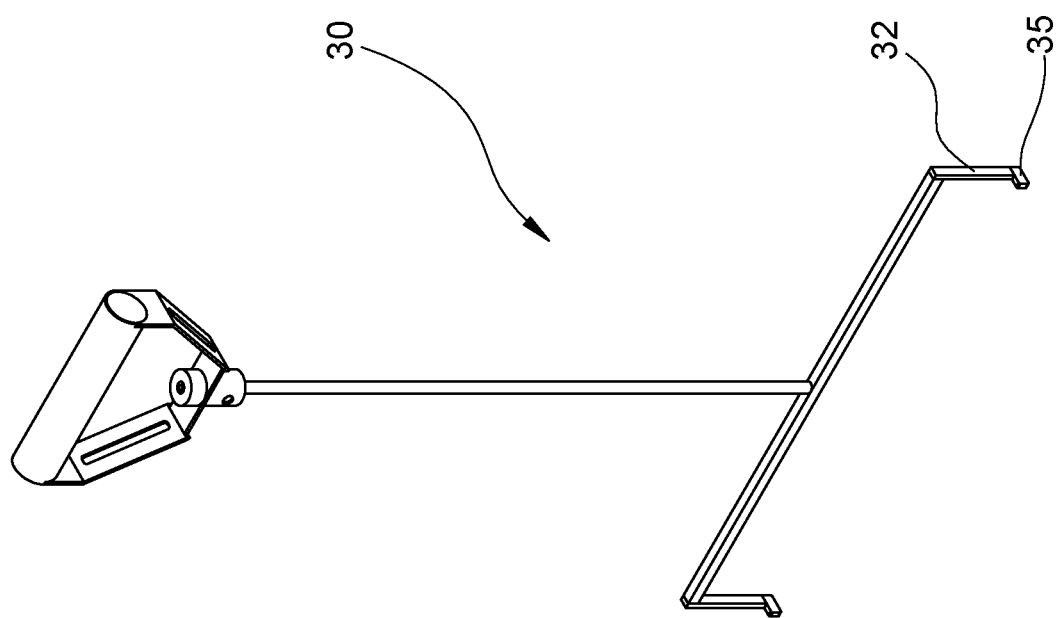
FIG. 19 is an axonometric view of a tool 30 for disengaging cable protectors.
Figure 20:
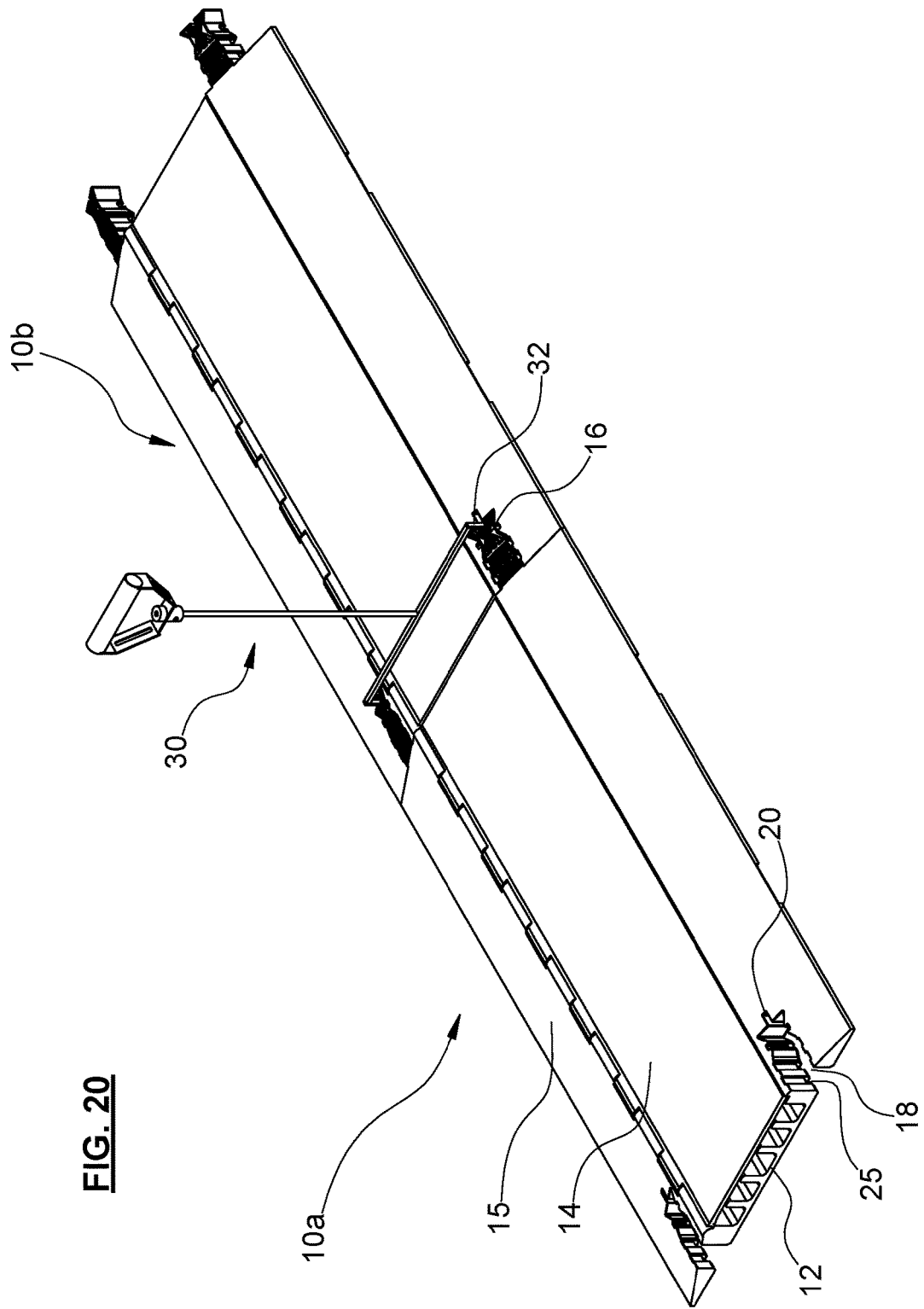
FIG. 20 is a top axonometric view corresponding to FIG. 17, showing two assembled cable protectors 10a, 10b with the tool 30 inserted in the openings 20.
Figure 21:
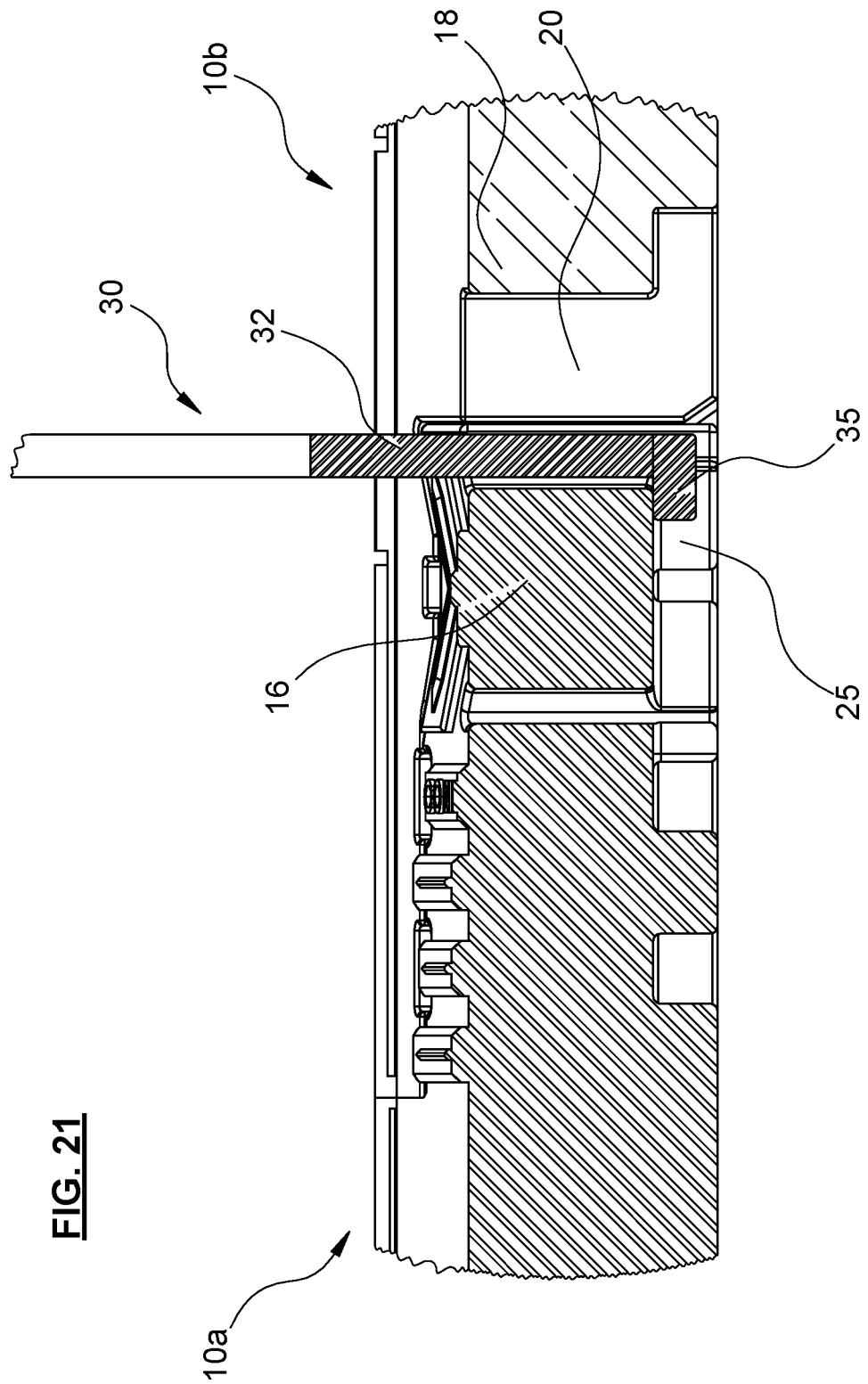
FIG. 21 is a detail vertical cross-sectional view of the end connectors 16, 18 after insertion of the tool 30, corresponding to FIG. 20.

FIG. 19 illustrates one possible embodiment of a tool 30 that can be used to engage the slots 20 and undercuts 25 to disconnect a series of cable protectors. This tool 30 has two vertical members 32 (e.g., rods) designed to be inserted into corresponding openings 20 in the top of a cable protector 10, as shown in FIG. 20. Horizontal protrusions 35 at the lower ends of the vertical members 32 removably engage the undercuts 25 in the cable protector 10b as depicted in FIGS. 21 and 22.

The user initially inserts the rods 32 of the tool 30 vertically downward into the slots 20 in the top of the cable protector. The horizontal protrusions 35 can be made to engage the undercuts 25 in the openings 20 either by slightly pivoting the upper end of the tool 30, or shifting the entire tool 30 slightly forward in the openings 20 toward the undercuts 25, so that the horizontal protrusions 35 extend into the undercuts 25 and also catch under the undercuts 25. The user then exerts an upward force on the tool 30 to lift the cable protector 10a and disconnect its end connectors 16, 18 from those of the adjacent cable protector 10b, as shown in FIGS. 22 and 23. The user can then reverse the insertion process to disengage and remove the tool 30 from the cable protector.

It should be noted that the size, shape and proportions of these openings 20 and undercuts 25 are largely a matter of design choice. It should also be understood that the terms "opening", "slot", "channel" and "undercut" should be broadly construed. A relatively small opening or narrow slot offers the advantages of being visually unobtrusive, minimizing the risk of being a trip hazard, and minimizing the risk of the slot becoming obstructed with dirt or debris. However, the openings 20 could have a wide range of shapes, dimensions and proportions. For example, the openings 20 could be rectangular, square, circular, tapered, oval or formed as slots tangential to the peripheral wall of the end connector. Also, the undercuts 25 can have any desired shape, dimensions and proportions.

Figure 22:
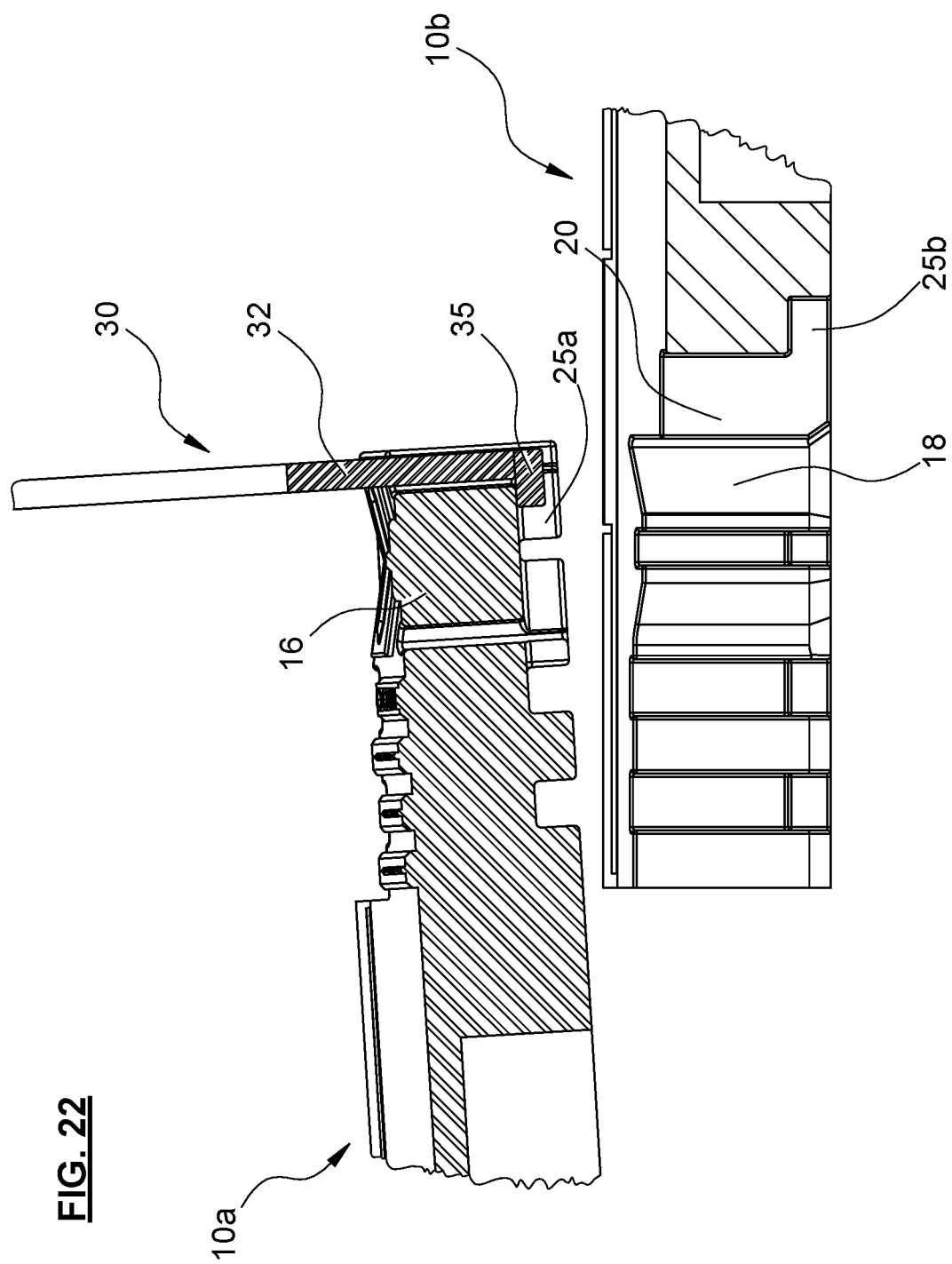
FIG. 22 is a detail vertical cross-sectional view of the end connectors 16, 18 showing the tool 30 being lifted upward to disassemble the cable protectors 10a, 10b.
Figure 23:
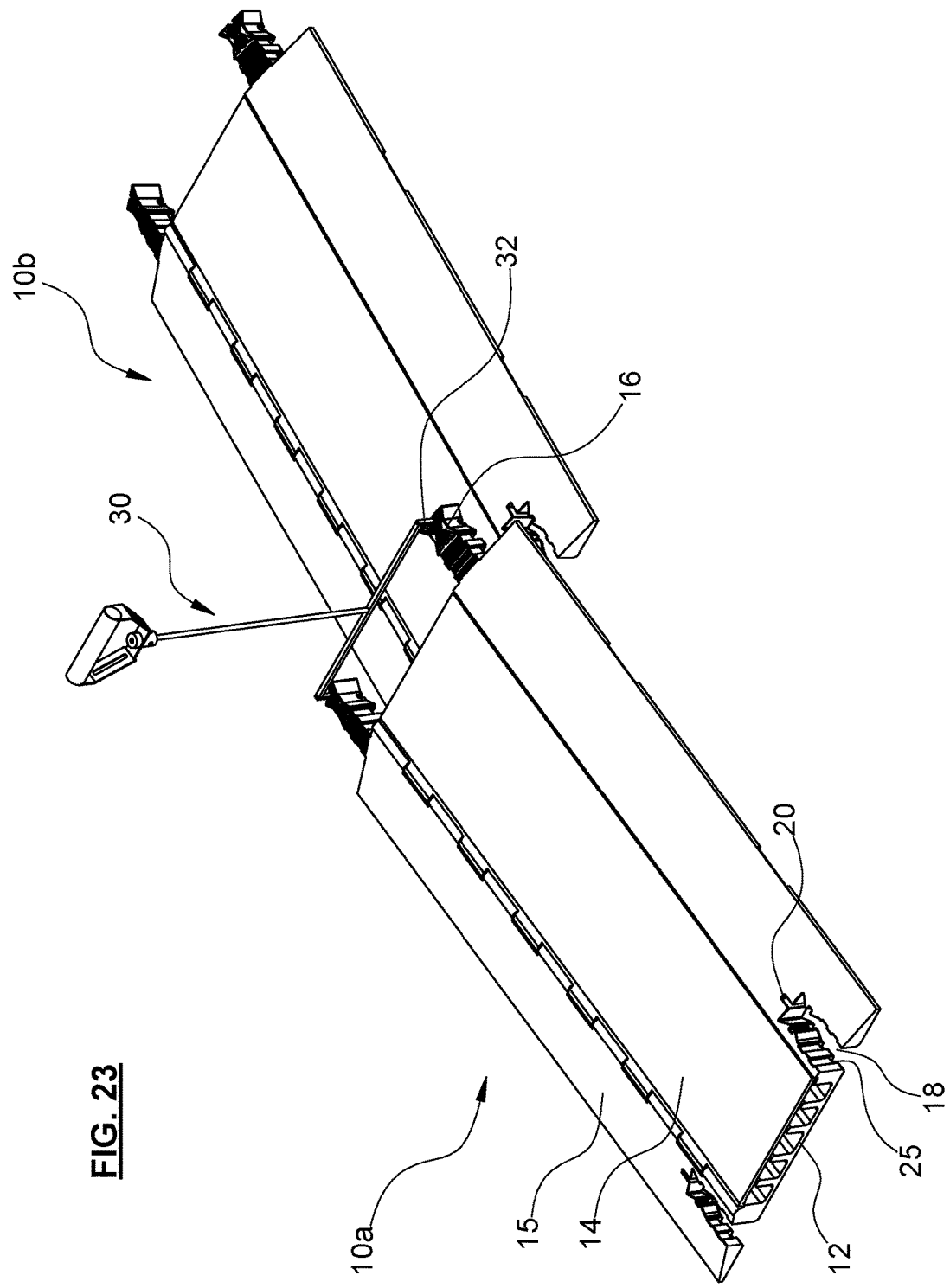
FIG. 23 is a top axonometric view of two cable protectors 10a, 10b being disassembled by means of the tool 30, corresponding to FIG. 22.

Each opening 20 can be provided with multiple undercuts 25a, 25b, as shown for example in FIG. 22, allowing the tool 30 to be inserted in more than one orientation. In FIG. 22, one undercut 25a extends under the male end connector 16, while the second undercut 25b extends under the female end connector 18 of the adjacent cable protector 10b. The tool 30 can be inserted in either direction to lift upward on either cable protector 10a or 10b.

The locations of the openings 20 and undercuts 25 on the end connectors 16, 18 are also largely a matter of design choice. The accompanying figures show an embodiment of the present invention in which the vertical openings 20 are formed by aligned vertical channels that are recessed partially into the peripheral walls of both the male and female end connectors 16, 18. Both the male and female end connectors 16, 18 have recesses and regions of contact at intervals along their peripheral walls. When assembled, the recesses in the females end connectors 18 align with the recesses in the adjacent male end connectors 16 to define a series of openings 20 between adjacent end connectors 16, 18 at intervals around their periphery. The undercuts 25 can extend horizontally outward from the bottoms of the openings 20 and underlie the adjacent portions of either or both end connectors 16, 18 to allow the tool to be inserted in either orientation.

Similarly, the regions of contact in the peripheral walls of the end connectors 16, 18 are also aligned when assembled to create a suitable fiction fit between the adjacent male and female end connectors 16, 18 as shown in FIGS. 14, 15 and 17. This pattern of openings 20 and regions of contact adds a degree of flexibility to the end connectors 16, 18, that reduces the effort required to disassemble the cable protectors 10a, 10b, and also helps to prevent binding between adjacent end connectors 16, 18. Alternatively, the openings 20 could be formed entirely in the peripheral walls of either the male end connectors 16 or the female end connectors 18.

It should be noted that the undercut 25 could extend only beneath the same end connector (i.e., either the male end connector 16 or female end connector 18) that is equipped with the opening 20. In this configuration, the tool 30 is used to lift upward on the end connector equipped with the opening 20. However, the undercut 25 could extend into or beneath an adjacent end connector, so that the tool 30 could be used to lift upward on the adjacent end connector.

The openings 20 can also be used for other purposes. For example, the openings can be used as hanging points to removably engage prongs of a wall mount bracket. This would allow the cable protectors to be stored by hanging them from a wall mount bracket. The openings 20 and undercuts 25 also create more ergonomic surfaces for gripping and transporting cable protectors by hand.

Figure 24:
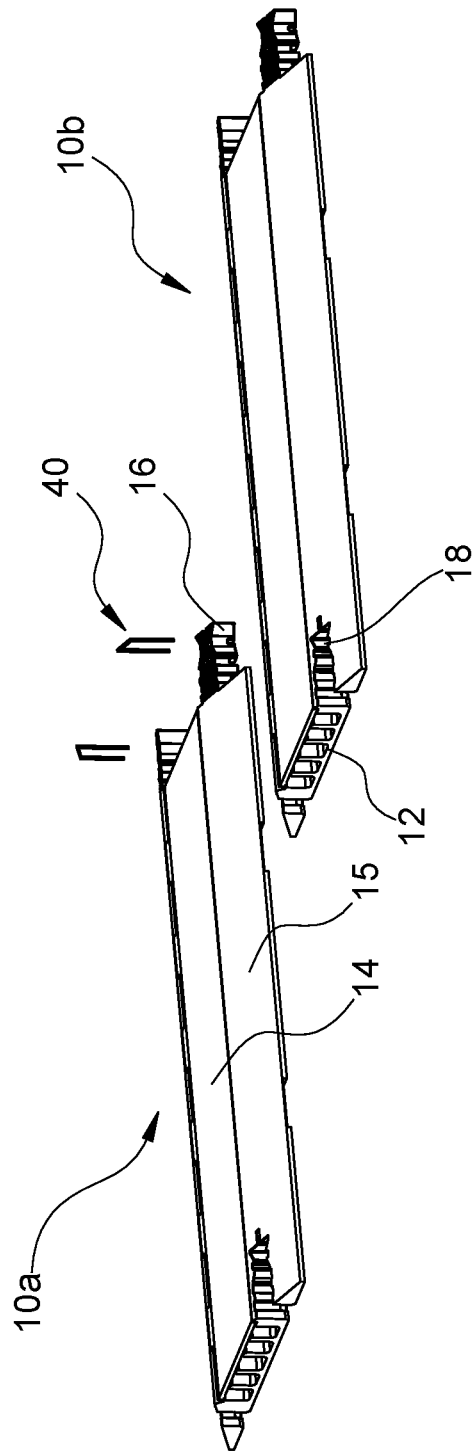
FIG. 24 is an exploded axonometric view of a staple 40 being inserted through the openings 20 in the end connectors 16, 18 of two assembled cable protectors 10a, 10b.

The male end connectors 16 can also be equipped with additional holes extending downward through the male end connectors 16. For example, FIG. 24 shows a staple 40 being inserted through the openings 20 to anchor the cable protectors 10a, 10b to the ground. Similarly, a nail, spike or screw 42 could be inserted through an opening 20 or a hole in the male end connector to anchor the cable protectors as illustrated in FIG. 25.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

I claim:

1. A modular cable protector comprising:
   a body having an upper surface, opposing side ramps and opposing ends;
   at least one channel extending in parallel between the ends;
   male end connectors on at least one end of the cable protector having peripheral walls with upper edges;
   female end connectors on at least one end of the cable protector having peripheral walls with upper edges; said female end connectors removably engaging the male end connectors of an adjacent cable protector, thereby enabling cable protectors to be connected in series with the channels in alignment with the channels of an adjacent cable protector;
   a plurality of openings extending downward from the upper edges along the walls between adjacent end connectors defining a pattern of gaps and regions of contact between the walls of adjacent end connectors, wherein at least one of said openings has a lower portion with an undercut extending horizontally from the lower portion of the opening; and
   a tool having a vertical member with a lower end insertable into the opening and a horizontal protrusion extending from the lower end of the vertical member for removably engaging the undercut.

2. The modular cable protector of claim 1 wherein the undercut extends into the male end connector.

3. The modular cable protector of claim 1 wherein the undercut extends into the female end connector.

4. The system of claim 1 wherein the openings are formed by vertical channels recessed into the walls of the male and female end connectors, and are separated by regions of contact.

5. A modular cable protector comprising:
   a body having an upper surface, opposing side ramps and opposing ends;
   at least one channel extending in parallel between the ends;
   male end connectors on at least one end of the cable protector having peripheral walls with upper edges;
   female end connectors on at least one end of the cable protector having peripheral walls with upper edges; said female end connectors removably engaging the male end connectors of an adjacent cable protector, thereby enabling cable protectors to be connected in series with the channels in alignment with the channels of an adjacent cable protector;
   a plurality of openings extending downward from the upper edge into an end connector along the walls between adjacent male and female end connectors defining a pattern of gaps and regions of contact between the walls of adjacent end connectors, at least one of said openings having a lower portion;
   an undercut extending horizontally from the lower portion of the opening; and
   a tool having a vertical member with a lower end insertable into the opening and a horizontal protrusion extending from the lower end of the vertical member for removably engaging the undercut.

6. The modular cable protector of claim 5 wherein the openings are formed by vertical channels recessed into the walls of the male and female end connectors, and are separated by regions of contact.

7. The modular cable protector of claim 5 wherein the undercut extends into the male end connector.

8. The modular cable protector of claim 5 wherein the undercut extends into the female end connector.

* * * * *